(12) United States Patent
Forutanpour et al.

(10) Patent No.: US 8,494,770 B2
(45) Date of Patent: Jul. 23, 2013

(54) METHOD AND SYSTEM FOR GENERATING SAVINGS ROUTES WITH A PORTABLE COMPUTING DEVICE

(75) Inventors: Babak Forutanpour, San Diego, CA (US); Wolfgang G. Frank, San Diego, CA (US); Sumesh Udayakumaran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 313 days.

(21) Appl. No.: 13/048,125

(22) Filed: Mar. 15, 2011

(65) Prior Publication Data

US 2012/0239288 A1  Sep. 20, 2012

(51) Int. Cl.
*G01C 21/34* (2006.01)
*G01C 21/26* (2006.01)

(52) U.S. Cl.
USPC .................. 701/533; 701/541; 455/414.2

(58) Field of Classification Search
None
See application file for complete search history.

(56) References Cited

U.S. PATENT DOCUMENTS

| | | | |
|---|---|---|---|
| 7,177,826 B2 * | 2/2007 | Nishiwaki et al. | 705/26.61 |
| 7,308,356 B2 * | 12/2007 | Melaku et al. | 701/533 |
| 2002/0065604 A1 | 5/2002 | Sekiyama | |
| 2007/0078596 A1 | 4/2007 | Grace | |
| 2007/0106468 A1 * | 5/2007 | Eichenbaum et al. | 701/211 |
| 2008/0208462 A1 | 8/2008 | Tanaka | |
| 2008/0270016 A1 | 10/2008 | Proietty et al. | |
| 2008/0275646 A1 | 11/2008 | Perng et al. | |
| 2008/0319658 A1 | 12/2008 | Horvitz et al. | |
| 2009/0210302 A1 | 8/2009 | Tashev et al. | |
| 2009/0228207 A1 * | 9/2009 | Sasano | 701/210 |
| 2010/0036606 A1 | 2/2010 | Jones | |
| 2010/0082437 A1 | 4/2010 | Tamayama et al. | |
| 2011/0225068 A1 * | 9/2011 | Figueroa et al. | 705/27.1 |

FOREIGN PATENT DOCUMENTS

DE  102008029430 A1  12/2009

OTHER PUBLICATIONS

International Search Report and Written Opinion—PCT/US2012/028775—ISA/EPO—Jun. 27, 2012.

* cited by examiner

*Primary Examiner* — Michael J Zanelli
(74) *Attorney, Agent, or Firm* — Nicholas A. Cole (57) ABSTRACT

A method and system for calculating savings routes for display on a portable computing device (PCD) are described. The method includes receiving at least one of a product category and a service category from an operator of a PCD. The PCD may also receive a destination address. With this information, circle of influence data based on an offer for at least one product or service corresponding to the product category or service category may be generated and provided to the PCD. The circle of influence data may impact edge weights of a graph search algorithm. The graph search algorithm solves a single-source shortest path problem for a graph with nonnegative edge path costs. The circles of influence in combination with the graph search algorithm allow a PCD to calculate one or more savings routes based on a start point and the desired destination address provided by the operator of the PCD.

36 Claims, 8 Drawing Sheets

METHOD AND SYSTEM FOR GENERATING SAVINGS ROUTES WITH A PORTABLE COMPUTING DEVICE

DESCRIPTION OF THE RELATED ART

Portable computing devices ("PCDs") are becoming necessities for people on personal and professional levels. These devices may include cellular telephones, portable/personal digital assistants ("PDAs"), portable game consoles, portable navigation units, palmtop computers, and other portable electronic devices.

PCDs may run software for providing navigational assistance to an operator of a PCD. While this software may be helpful to the operator in determining directions to reach a desired destination, such software is generally one-dimensional and does not address other needs of an operator. Other needs of an operator may include completing errands such as going to a bank or shopping for goods or services. Other needs of an operator of a PCD may include finding discounts on products and services when such discounts are available.

In addition to problems faced by operators of PCDs, merchants and service providers are constantly looking for ways to attract consumers into their respective businesses. Merchants and service providers usually face challenges such as determining what are the most cost-efficient ways of advertising discounts and offers in order to attract consumers into their respective storefronts and professional offices.

Accordingly, what is needed in the art is a method and system that addresses the navigational needs and efficiency needs of a consumer while also addressing the needs of merchants and service providers to attract consumers into respective storefronts. There is also a need in the art for a method and system which increases the efficiency of trips that may be planned with a PCD.

SUMMARY

A method and system for calculating savings routes for display on a portable computing device (PCD) are described. The method includes receiving at least one of a product category and a service category from an operator of a PCD. The PCD may also receive a destination address. With this information, circle of influence data based on an offer for at least one product or service corresponding to the product category or service category may be generated and provided to the PCD. The circle of influence data may impact edge weights of a graph search algorithm. The graph search algorithm solves a single-source shortest path problem for a graph with non-negative edge path costs. The circles of influence in combination with the graph search algorithm allow a PCD to calculate one or more savings routes based on a start point and the desired destination address provided by the operator of the PCD.

The method may also include displaying the one or more savings routes on a display screen of the PCD. The PCD may also receive a maximum distance an operator of the PCD is willing to travel relative to the destination address. The PCD may receive a desired number of savings routes for display on the display screen of the PCD. The PCD may also receive a minimum desired savings value corresponding to benefits available for each calculated savings route.

BRIEF DESCRIPTION OF THE DRAWINGS

In the figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") and fourth generation ("4G") wireless technology, greater bandwidth availability has enabled more portable computing devices with a greater variety of wireless capabilities.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology, have enabled numerous PCDs with multiple capabilities. Therefore, a PCD may be a cellular telephone, a satellite telephone, a pager, a personal digital assistant ("PDA"), a smartphone, a navigation device, a smartbook or reader, a media player, a combination of the aforementioned devices, and a laptop computer with a wireless connection, among others.

Figure 1A:
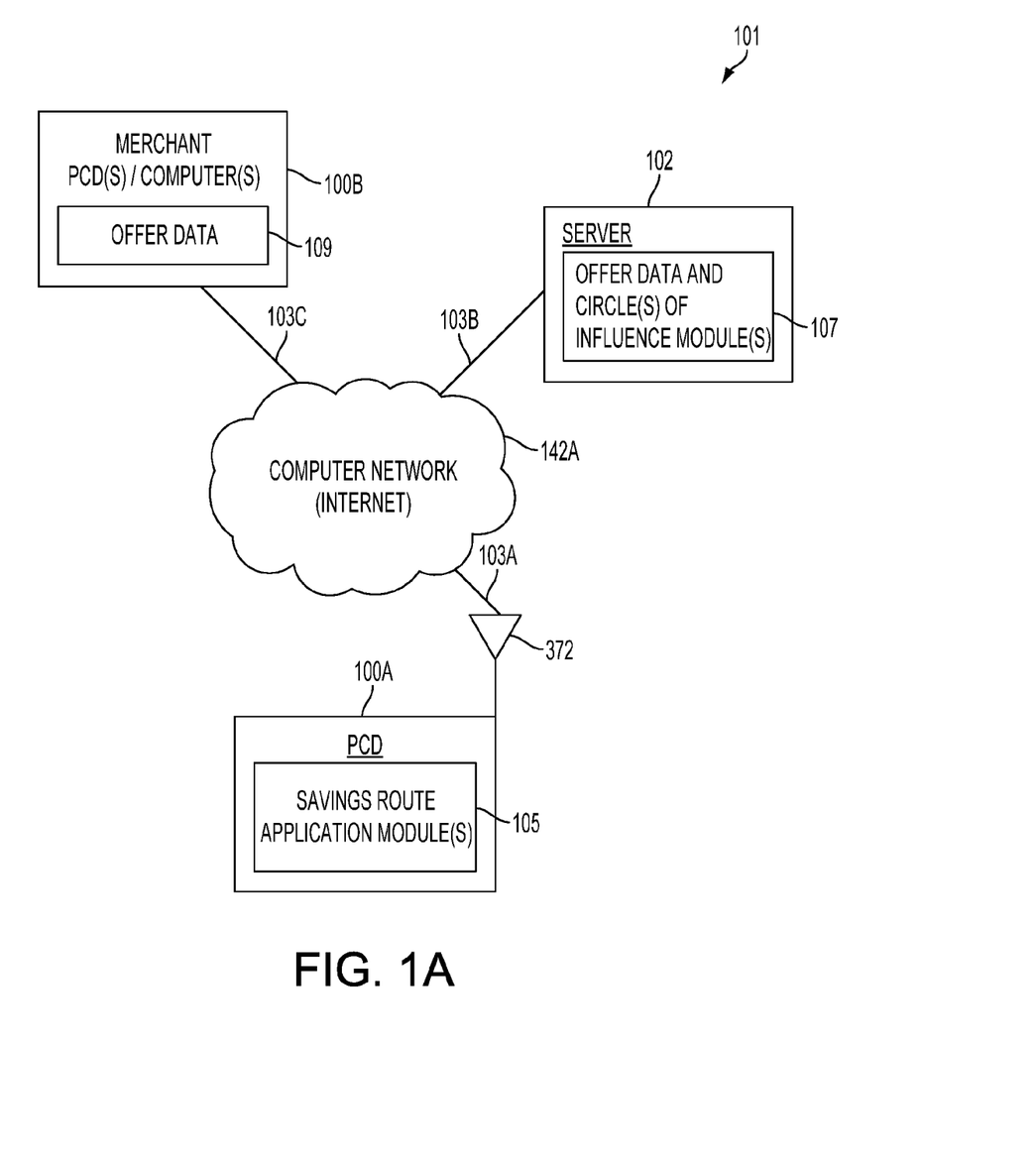
FIG. 1A is a functional block diagram illustrating exemplary elements of a system for increasing the efficiency of planned trips by producing savings routes using a portable computing device ("PCD")

FIG. 1A is a functional block diagram illustrating exemplary elements of a system 101 for increasing the efficiency of planned trips by producing savings routes using a portable computing device ("PCD") 100A. The system 101 may comprise a PCD 100A, a computer server 102, and a merchant or service provider computer 100B. Many of the system elements illustrated in FIG. 1A are coupled via communications links 103 to the communications network 142A.

The links 103 illustrated in FIG. 1A may comprise wired or wireless links. Wireless links include, but are not limited to, radio-frequency ("RF") links, infrared links, acoustic links, and other wireless mediums. The communications network 142A may comprise a wide area network ("WAN"), a local area network ("LAN"), the Internet, a Public Switched Telephony Network ("PSTN"), a paging network, or a combination thereof. The communications network 142A may be established by broadcast RF transceiver towers. However, one of ordinary skill in the art recognizes that other types of communication devices besides broadcast RF transceiver towers are available for establishing the communications network 142A. The PCD 100A is shown to have an antenna 372 (see FIG. 1B) so that a respective PCD 100A may establish wireless communication links 103A with the communications network 142A via RF transceiver towers.

The PCD 100A may comprise a savings route application module 105. The savings route application module 105 may comprise software or hardware or both. According to one exemplary embodiment, the savings route application module 105 comprises software that is executed by one or more processors 110 within the PCD 100A. The savings route application module 105 may generate one or more different maps that list savings routes such as those illustrated in FIGS. 2-4 as described in further detail below. The savings route application module 105 may be responsible for receiving desired product and service information from an operator of the PCD 100A and relaying this information to the computer server 102.

The computer server 102 receives the desired product and service information from the PCD 100A over the computer network 142A and uses this information to filter offer data 109. The computer server 102 receives offer data 109 from one or more merchant computers 100B. Specifically, the computer server 102 runs an offer data and circle of influence application module 107 that filters products and services desired by an operator of the PCD 100A against offer data 109 supplied by merchant computers 100B. The offer data and circle of influence application module 107 may be responsible for adjusting edge weight data that is used to generate the savings routes illustrated in FIGS. 2-4. The offer data and circle of influence application module 107 will be described in further detail below in connection with FIG. 5.

The offer data 109 produced by one or more merchant computers 100B may comprise offers on discounts and savings for specific products or services that may be sold by a merchant or service vendor. The offer data 109 may be automatically updated and provided to the server 102 during specified periods of time. The offer data 109 may be updated by a merchant computer 100B on a monthly, weekly, daily, hourly, or per transaction or per request basis. The offer data 109 may be generic such that an offer is written for any type of consumer. Alternatively, the offer data 109 may be specific and individualized such that a particular offer is only valid for a single consumer. The merchant computer 100B may also generate both types of offer data 109 (personalized or generic).

For offer data 109 that is specific and personalized, the merchant computer 100B may generate such offer data 109 when the server 102 relays the identity or account information corresponding to the operator of the PCD 100A. For example, when an operator of the PCD 100A expresses an interest in specific types of products and/or services, the computer server 102 may relay the identity or an account number associated with the operator of the PCD 100A to the merchant computer 100B. If the merchant computer 100B determines that the identity or account number corresponds to an existing customer, then the merchant computer 100B may provide specific offers that are unique to that existing customer. These specific offers that are unique may be based on records that the merchant computer 100B may have in its database that correspond with the identity or account number of the operator of the PCD 100A.

Figure 1B:
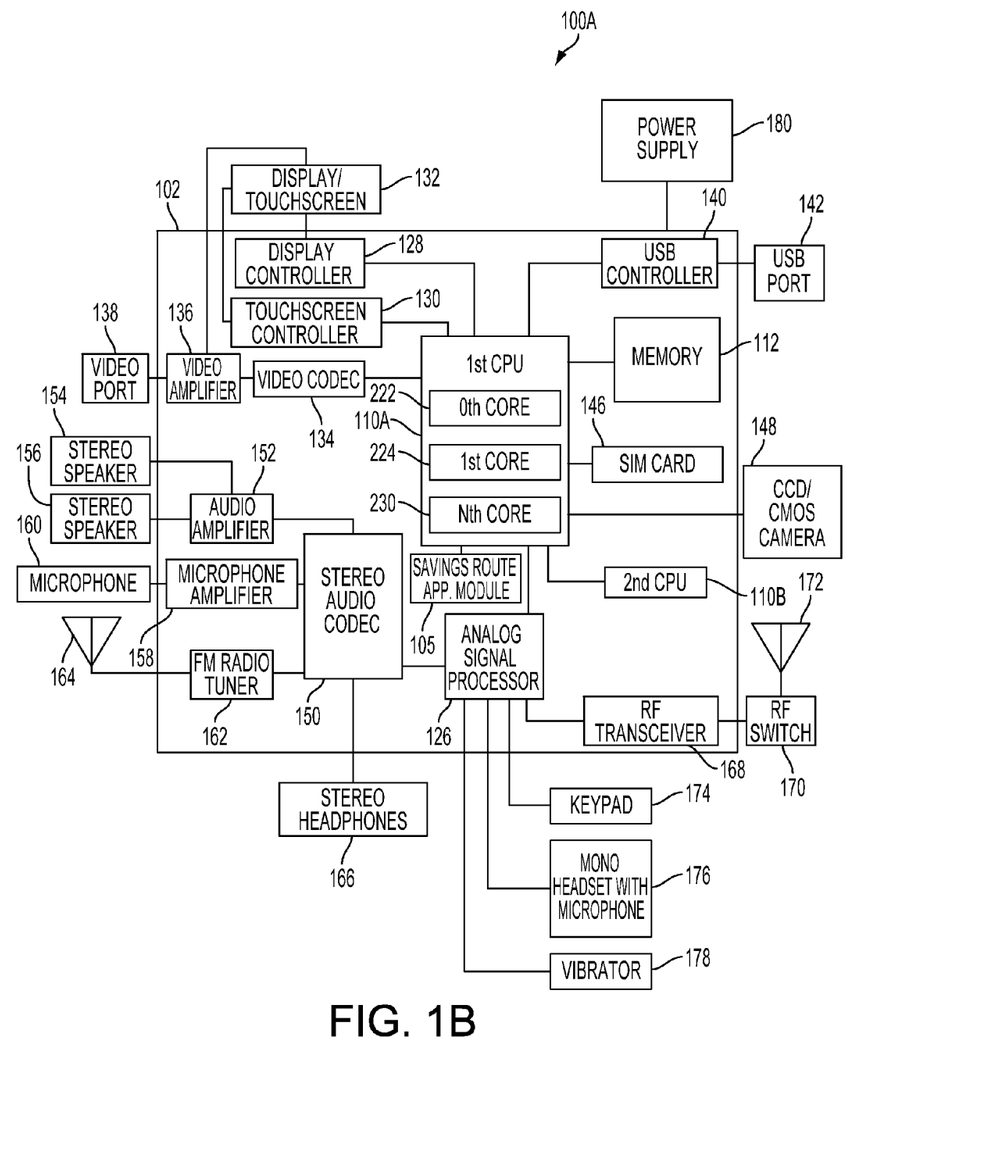
FIG. 1B is a functional block diagram illustrating an embodiment of a portable computing device (PCD)

FIG. 1B: Savings Route System Elements of PCD 100a

Figure 2:
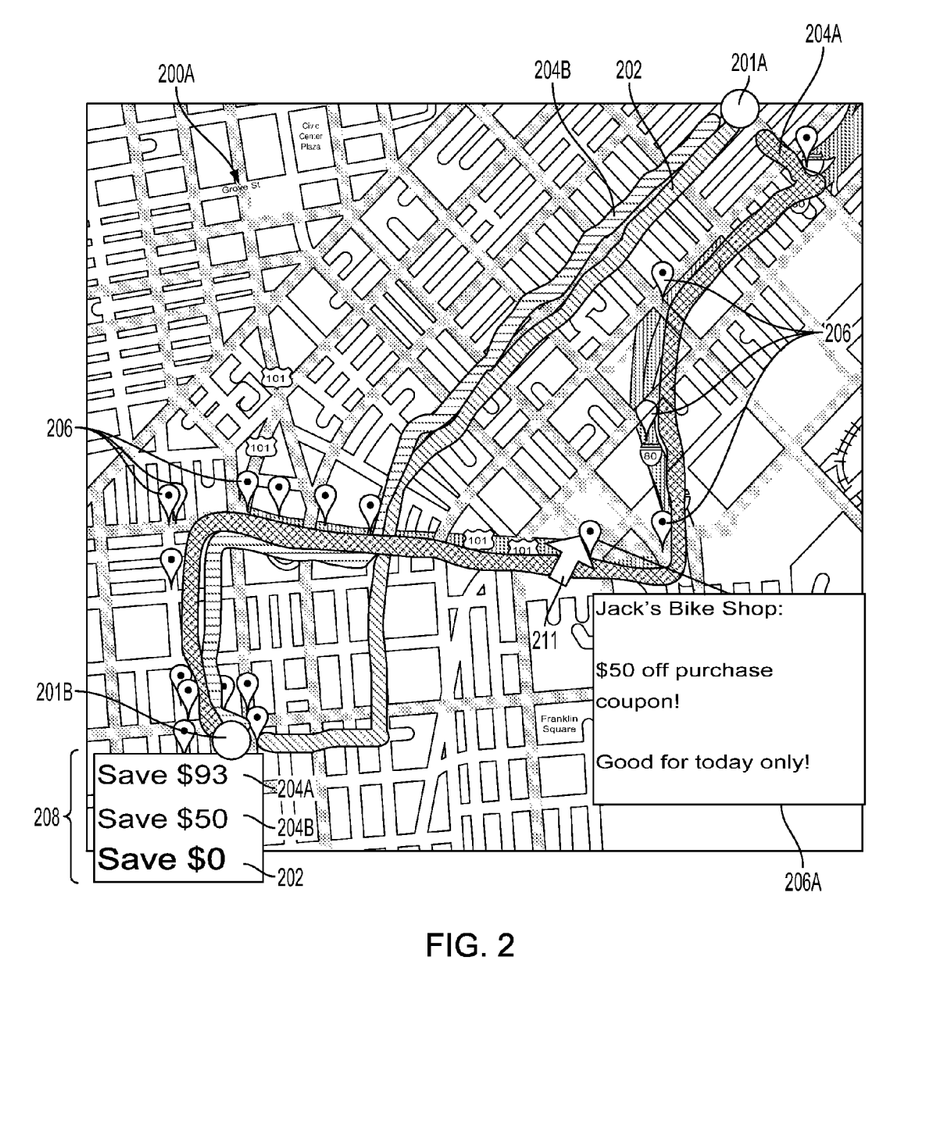
FIG. 2 is an exemplary map for displaying a plurality of savings routes.
Figure 3:
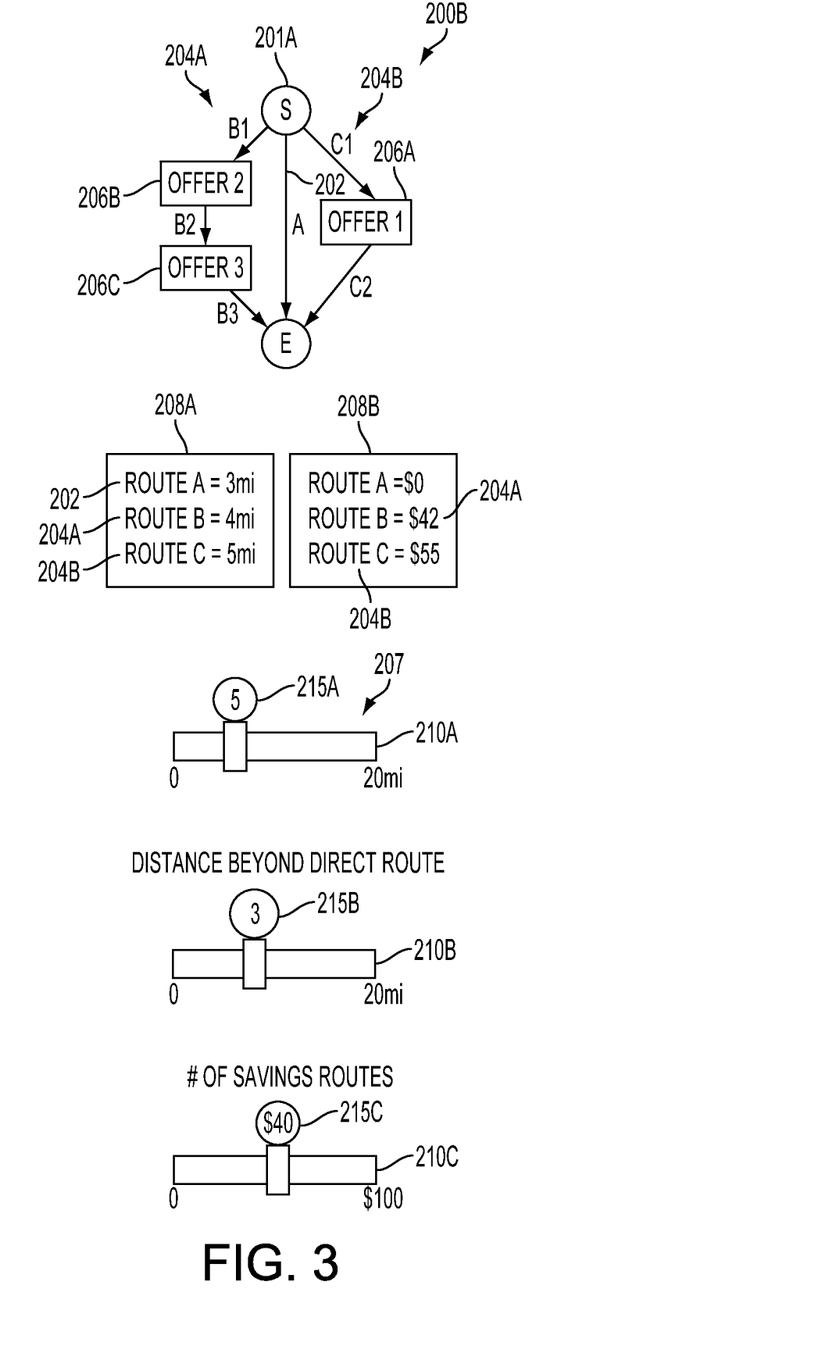
FIG. 3 is a first diagram illustrating an exemplary user interface for adjusting parameters corresponding to savings routes that may be displayed with the PCD.
Figure 4:
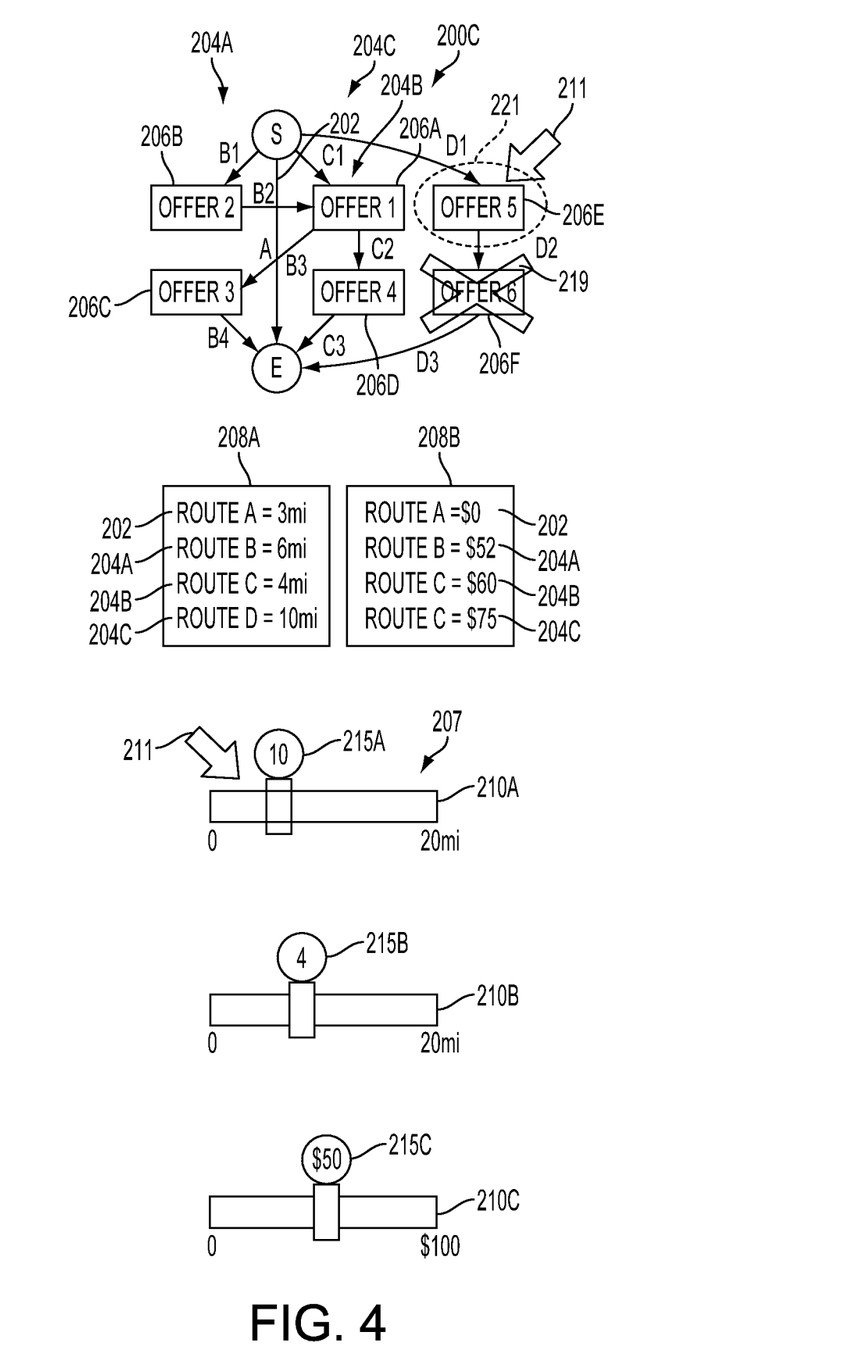
FIG. 4 is a second diagram illustrating an exemplary user interface for adjusting parameters corresponding to savings routes that may be displayed with the PCD.

Referring to FIG. 1B, this FIG. is a functional block diagram of an exemplary, non-limiting aspect of a PCD 100A in the form of a wireless telephone for implementing methods and systems for generating savings routes as illustrated in FIGS. 2-4. As shown, the PCD 100 includes an on-chip system 102 that has a multi-core, first central processing unit ("CPU") 110A, a second CPU 110B that is a single-core type, and an analog signal processor 126. These processors 110A, 110B, and 126 may be coupled together. The first CPU 110A may comprise a zeroth core 222, a first core 224, and an Nth core 230 as understood by one of ordinary skill in the art. In an alternate embodiment, instead of using two CPUs 110, two digital signal processors ("DSPs") may also be employed as understood by one of ordinary skill in the art.

FIG. 1B includes one or more savings route application modules 105. For the remainder of this description, the module(s) 105 will be referred to in the singular, as a module 105, and not plural. One of ordinary skill in the art will recognize that the module 105 may be divided into various parts and executed by different processors 110, 126 without departing from the invention. Alternatively, the module 105 may be organized as a single element and executed by a single processor 110 or 126.

As noted above, the module 105 may comprise software which is executed by the CPUs 110. However, the module 105 may also be formed from hardware and/or firmware as understood by one of ordinary skill in the art.

In general, the module 105 may be responsible for generating savings routes 204, such as those illustrated in FIGS.

2-4. FIG. 1B shows that the PCD 100 may include memory 112. The module 105 running on the CPUs 110 may access memory 112 to execute function calls originating from the savings route application module 105 as will be described in further detail below.

In a particular aspect, one or more of the method steps described herein may implemented by executable instructions and parameters stored in the memory 112 that form the savings route module 105. These instructions that form the savings route module 105 may be executed by the CPUs 110, the analog signal processor 126, or another processor. Further, the processors, 110, 126, the memory 112, the instructions stored therein, or a combination thereof may serve as a means for performing one or more of the method steps described herein.

FIG. 1B: Other Elements of the PCD 100*a*

As illustrated in FIG. 1B, a display controller 128 and a touchscreen controller 130 are coupled to the digital signal processor 110. A touchscreen display 132 external to the on-chip system 102 is coupled to the display controller 128 and the touchscreen controller 130.

FIG. 1B is a schematic diagram that illustrates a video coder/decoder ("codec") 134, e.g., a phase-alternating line ("PAL") encoder, a sequential couleur avec memoire ("SECAM") encoder, a national television system(s) committee ("NTSC") encoder or any other type of video encoder 134 coupled to the multicore central processing unit ("CPU") 110. A video amplifier 136 is coupled to the video encoder 134 and the touchscreen display 132. A video port 138 is coupled to the video amplifier 136. As depicted in FIG. 1B, a universal serial bus ("USB") controller 140 is coupled to the CPU 110. Also, a USB port 142 is coupled to the USB controller 140. A subscriber identity module (SIM) card 146 may also be coupled to the CPU 110. Further, as shown in FIG. 1B, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 1B, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1B shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1B further indicates that a radio frequency ("RF") transceiver 168 may be coupled to the analog signal processor 126. An RF switch 170 may be coupled to the RF transceiver 168 and an RF antenna 172. As shown in FIG. 1B, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1B also shows that a power supply 180, for example a battery, is coupled to the on-chip system 102. In a particular aspect, the power supply 180 includes a rechargeable DC battery or a DC power supply that is derived from an alternating current ("AC") to DC transformer that is connected to an AC power source.

As depicted in FIG. 1B, the touchscreen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157B, and the power supply 180 are external to the on-chip system 322.

FIG. 2 is an exemplary map 200A for displaying a plurality of savings routes 204. This map 200A may be rendered on the display 132 of the PCD 100A. In addition to the savings routes 204, the exemplary map 200A may further include a direct route 202. The direct route 202 typically comprises the shortest route between a start point 201A and an endpoint 201B and it may not include any savings. The savings routes 204 are typically not the shortest route between the start point 201A and the endpoint 201B. The savings routes 204 usually display one or more offers 206 that are available along a particular savings routes 204.

These offers 206 along the savings routes 204 may comprise offers for goods and/or offers for services at particular store fronts and offices that may be next to the savings route 204 plotted by the PCD 100A. The offers 206 present along a particular savings route 204 may be based on the offer data 109 provided by the merchant computers 100B as illustrated in FIG. 1.

The savings routes 204 may comprise distances which are greater than the direct route 202 between the start point 201A and endpoint 201B. However, the savings routes 204 provide an operator of a PCD 100A with the opportunity to purchase goods or services or both that may be of interest to the operator of the PCD 100A. Also, one of ordinary skill the art recognizes that savings routes 204 may exist and which may be equivalent to or shorter in distance relative to the direct route 202. As illustrated by the legend 208 in FIG. 2, the first savings route 204A may provide a total savings of $93 to the operator of the PCD 100A, while the second savings route 204B may provide the operator with a total savings of $50. The direct route 202 may not provide any savings at all and is shown to save the operator zero (0) dollars.

The total savings listed in the legend 208 may comprise a summation of a total amount of money and/or value that may be saved along a particular savings route 204 if every offer 206 is accepted and taken by the operator of the PCD 100. The operator of the PCD 100A may customize what is displayed on the map 200A. The operator of PCD 100A may customize the map 200A by indicating only specific products and/or services to be displayed within the map 200A. Further, the operator may customize the map 200A to only display offers from specific vendors/merchants. In addition to showing the savings, operator may choose to see the extra distance travelled or extra cost per dollar saved to help decide which route 204 to take. Numerous modifications may be made along these examples to customize the information presented by the map 200A as understood by one of ordinary skill in the art.

Each savings route 204 and direct route 202 may be color-coded in order to differentiate the routes from one another. Alternatively, or in addition to color coding, each route 202, 204 may be provided with customized shading, hatching, and/or symbols so that each route 202, 204 has differentiating graphical elements that are easily perceptible to an operator.

As illustrated in FIG. 2, an operator of a PCD 100A may interact with the map 200A. According to one exemplary embodiment, an operator may use a mouse pointer 211 to hover over specific offers 206 in order to display additional information about the offers 206 displayed adjacent to a particular savings route 204. In the exemplary embodiment illustrated in FIG. 2, when the screen pointer 211 is positioned adjacent to or directly over an offer 206, further details about specific offers such as offer 206A may be displayed to the operator of the PCD 100A. Offer 206A comprises an advertisement from a product vendor known as "Jack's Bikes."

The offer 206A comprises a $50 off coupon that is good only for the current day in which the map 200A has been displayed to the operator. The offer 206A may have been a generic one created by a merchant and entered into the merchant computer 100B. Alternatively, the offer may have been generated specifically for the operator of the current PCD 100A based on identity and/or account information that was passed from the computer server 102 to the merchant computer 100B. Generally, only offers 206 that are relevant or desired by the operator are displayed on the map 200A based on preferences provided by the operator of the PCD 100A to the computer server 102. One of ordinary skill the art will recognize that other offers for different types of products and/or services may be generated similar to the specific offer 206A illustrated in FIG. 2.

FIG. 3 is a first diagram illustrating an exemplary user interface 207 for adjusting parameters on a map 200B corresponding to savings routes that may be displayed with the PCD 100A. The map 200B comprises three routes: direct route A (202) which is the shortest route between the start point 201A and the endpoint 201B, a first savings route B (204A), and a second savings route C (204B). The first savings route 204A has three segments B1, B2, and B3 between a second offer 206B and a third offer 206C. The 2nd savings route 204B has two segments C1, C2 between a first offer 206A.

The user interface 207 may comprise an adjustable graphic such as an adjustable slider bar 210. The exemplary user interface 207 may comprise three slider bars 210A, 210B, and 210C. Each slider bar 210 may also comprise an adjustable block 215. This adjustable block 215 may be moved laterally by an operator of the PCD 100A along a slider bar 210. The adjustable block 215 allows an operator to select magnitudes for a particular variable that corresponds with the amount of adjustment made to the adjustable block 215 along a particular slider bar 210. Other graphics besides slider bars 210 and adjustable blocks 215 may be used as understood by one of ordinary skill in the art. For example, instead of or in addition to slider bars 210, the graphics may comprise drop down and selectable menus.

The first slider bar 210A may be assigned to an adjustable parameter for the map 200B. One such parameter may comprise the amount of distance beyond a direct route between the start point 201A and endpoint 201B that an operator is willing to travel in order to learn the of offers 206. The second slider bar 210 may be assigned to a parameter that corresponds to how many savings routes 204 the operator desires to display on the display device 132. The third slider bar 210C may be assigned to a parameter that corresponds to the minimum savings for each savings route. The minimum savings may be a value that an operator wants to have before entertaining the possibility of traveling along a particular savings route 204.

In the exemplary embodiment illustrated in FIG. 3, the first slider bar 210A has a minimum value of zero miles and a maximum value of twenty miles. The second slider bar 210B has a minimum value of zero routes and a maximum value of twenty routes. The third slider bar 210C has a minimum value of zero and a maximum value of one hundred U.S. dollars. Other minimum and maximum values may be used and additional or fewer slider bars 210 may be used is recognized by one of ordinary skill the art. Different parameters may also be tracked compared to the parameters illustrated in FIG. 3 as understood by one of ordinary skill in the art. For example, instead of tracking distance beyond a direct route 202, an amount of time may be selected by the operator of the PCD 100A. Also different units of measure and currency, like Euros and kilometers, may be used as understood by one of ordinary skill in the art.

In the exemplary embodiment illustrated in FIG. 3, the first adjustable block 215A has been selected to display a value of five miles that the operator is willing to travel beyond any distance calculated for the direct route 202. The second adjustable block 215B has been selected to display a value of three savings routes an operator desires to display within the map 200B. The third adjustable block 215C has been selected to display a value of $40 as the minimum amount of savings that each savings route 204 must have in order to display the route 204 within the map 200B.

Therefore, in view of these parameters selected by the operator for the user interface 207, each savings route 204 may not have a total distance greater than 5 miles relative to the total distance for the direct route 202. As conveyed by the first legend 208A, the direct route 202 has a distance of three miles, while the first savings route 204A has a distance of four miles and the second savings route 204B has a distance of five miles.

Further, the total number of savings routes 204 that may be displayed within map 200B cannot be greater than three in number. In the exemplary embodiment illustrated in FIG. 3, only two savings routes 204A, 204B were displayed because only two routes 204 were found by the PCD 100A that meet the additional parameter of having a total minimum savings amount of at least $40. As conveyed by the second legend 208B, the direct route 202 has a minimum savings of 0$ while the first savings route 204A has a first minimum savings of $42 and the second savings route 204B has a minimum savings of $55. As noted previously, other currencies, such as, but not limited to, Euros, Yen, etc. may be used as understood by one of ordinary skill the art.

After an adjustment is made to a respective slider bar 210, the savings route application module 105 may recalculate savings routes 204 based on the new adjustments selected by the operator of the PCD 100A. Alternatively, the savings route application module 105 may wait until the operator of the PCD 100A selects a command to recalculate the savings routes 204, such as a "recalculate" button (not illustrated) displayed on the display 132.

FIG. 4 is a second diagram illustrating an exemplary user interface 207 for adjusting parameters on a map 200C corresponding to savings routes that may be displayed with the PCD 100A. FIG. 4 is very similar to FIG. 3. Therefore, only the differences between these two FIGs. will be described below.

According to the exemplary embodiment illustrated in FIG. 4, a total of three savings routes 204A, 204B, and 204C beyond the direct route 202 have been displayed within the map 200C. The values for the adjustable blocks 215A, 215B, and 215C of the user interface 207 were selected as follows: a value of ten miles (block 215A) beyond the total distance of the direct route 202 that the operator is willing to travel for a particular savings route 204; a value of no more than four (block 215B) savings routes 204 are to be displayed within the map 200C; and a value of $50 (block 215C) as the minimum savings amount to be displayed by each savings route 204.

The exemplary embodiment of FIG. 4 also illustrates how specific offers 206 may be selected and the selected by an operator of the PCD 100A. An operator of the PCD 100A may use a screen pointer 211 to select and deselect specific offers 206 that are presented within a particular map 200C. Specifically, in the exemplary embodiment illustrated in FIG. 4, an operator deselected the sixth offer 206F. When the sixth offer 206F was deselected, a graphical character comprising an "X" was positioned over the sixth offer 206F to indicate that this offer would not be accepted by the operator and should be removed from the map 200C.

Meanwhile, the operator of the PCD 100A may also select specific offers 206 such as the fifth offer 206E with the pointer 211. To show the selection of an offer 206, the PCT 100A may generate a particular graphical character such as a dashed circle as illustrated in FIG. 4 to indicate that a particular offer 206 has been selected by the operator.

When the operator of the PCD 100A selects a specific offer 206, then the PCD 100A may generate the graphical characters such as a dashed semicircle. A specific offer 206 may be selected by double-clicking a particular button or it may be associated with particular keystrokes such as the "plus" sign to select an offer 206 and a "minus" sign to deselect a particular offer 206. The PCD 100A may also require that any map recalculations include a selected offer 206 within at least one savings route 204 even if the threshold dollar amount corresponding to the third slider bar 210C is not met or achieved.

Therefore, after any offers 206 are selected or deselected by the operator and after a recalculate command is issued, the PCD 100A may recalculate the savings routes 204 based upon the dropped offers 206 and the selected offers 206. The recalculate command may be associated with a user action or it may be issued automatically after an adjustable block 215 is selected or after a particular offer 206 has been selected within the map 200C.

Figure 5:
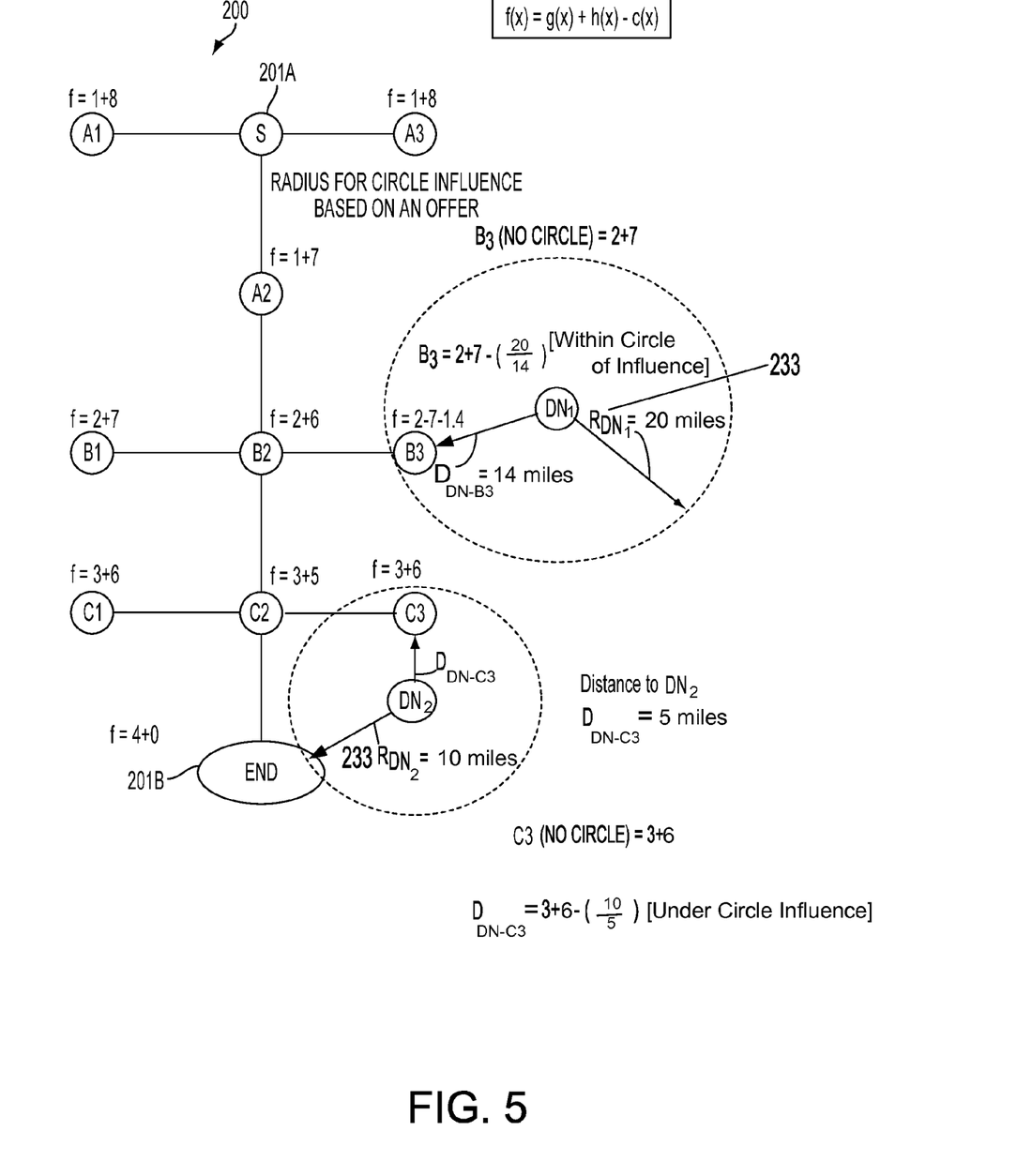
FIG. 5 is a diagram illustrating how savings routes may be calculated with a PCD.

FIG. 5 is a diagram illustrating how savings routes 204 of FIGS. 2-4 may be calculated with a PCD 100A. The savings route application module 105 may utilize a graph or tree search algorithm, similar to Dijkstra's shortest path algorithm. As understood by one of ordinary skill in the art, Dijkstra's shortest path algorithm was conceived by Dutch computer scientist Edsger Dijkstra in 1956 and published in 1959. Dijkstra's shortest path algorithm is a graph search algorithm that solves the single-source shortest path problem for a graph with non-negative edge path costs, producing a shortest path tree as understood by one of ordinary skill in the art.

The graph or tree algorithm utilized by the savings route application module 105 may work in a similar manner relative to Dijkstra's shortest path algorithm. For example, the algorithm may be governed by the following equation $$f(x)=g(x)+h(x)-c(x) \qquad \text{EQ. 1}$$

where f(x) is a routing function which calculates the shortest distance between a start point 201A and an endpoint 201B; g(x) is the distance traveled from the start point 201A; h(x) is the distance remaining to get to the endpoint 201B; and c(x) is a weighting parameter that may be referred to as a coupon factor or a circle of influence on the routing function f(x). The circle of influence c(x) value may also be referred to as an edge weight as understood by one of ordinary skill in the art. The c(x) value may be defined by the following equation:

$$c(x)=RDN/DDN(x) \qquad \text{EQ. 2}$$

where RDN is a fixed value for the radius ("R") of a circle of influence for a discount node ("DN") usually noted with distance units, like miles or kilometers; and DDN is the distance ("D") to a discount node ("DN)" usually noted with a distance unit, like miles or kilometers. The circle of influence c(x) value usually includes the summation of all circles of influence available and which may impact a particular node being evaluated. In many instances, distant circles of influence may be negligible relative to any circles of influence which may be closer to a current node being evaluated.

A radius for a particular circle of influence value ("RDN") may be established by the computer server 102 based on the magnitude of an offer. An offer may be provided by a service vendor or merchant for a particular location within the map 200. The computer server 102 may calculate R values based on the offer data and circle of influence module 107 after offer data 109 is uploaded from the merchant computer 100B. The RDN values may be determined so they correspond to the relative value of the offers being presented at a discount node (DN) (location).

For example, the first discount node (DN1) of FIG. 5 may have a circle of influence set to twenty miles which corresponds to an offer of a $50 off coupon for a new bike purchase. Meanwhile, the second discount node (DN2) of FIG. 5 may have a circle of influence set to ten miles which corresponds to an offer for a children's meal at a restaurant, valued at approximately $5. Since the children's meal having a value of approximately $5 is much less than the $50 off coupon for a new bicycle, the radius for the circle of influence for the second discount node (DN2) is set at a significantly lower value of ten miles compared to the twenty mile length radius set for the first discount node (DN1) having the larger discount value. One of ordinary skill in the art recognizes that the aforementioned circles of influence are but one way of calculating the edge weight function c(x). Other methods and algorithms for calculating edge weight functions c(x) are within the scope of this disclosure.

FIG. 5 illustrates how two different offers at discount nodes DN1 and DN2 having circles of influence with radii 233 impact the routing function f(x). The routing function f(x) begins with the start point 201A and reviews the distances between the start point 201A and its closest nodes A1, A2, and A3. The values for the routing function f(x) at the first node A1 and third node A3 are equal to (1+8). The number one represents the g(x) value or distance traveled from the start point 201A while the number eight represents the h(x) value or distance remaining to the end point 201B relative to either the first node A1 or third node A3.

The values for the routing function f(x) at the third node A2 are equal to (1+7). The number one represents the g(x) value or distance traveled from the start point 201A while the number seven represents the h(x) value or distance remaining to the end point 201B relative to the second node. For these first three nodes A1, A2, and A3, there are no circle of influence values c(x) or the c(x) values may negligible if they are too far away as understood by one of ordinary skill in the art.

The savings route application module 105 weighs the routing function f(x) values calculated for each of the first three nodes A1, A2, and A3. Since the second node A2 has a value of eight (1+7) while the other two nodes have a value of nine (1+8), the savings route application module 105 selects the segment or path between the start point 201A and the second node A2 as the preferred path to reach the endpoint 201B in the most efficient manner.

The savings route application module 105 then looks at the next set of nodes which are B1, B2, and B3 as illustrated in FIG. 5. The routing function values for each of the three nodes may be as follows: B1 (2+7); B2 (2+6); and B3 (2+7). As noted previously, the first number in each of these parenthetical expressions may comprise the g(x) value while the second number in each of these parenthetical expressions may comprise the h(x) value as described above.

The savings route application module 105 will logically select the node with routing function values that are based on the lowest g(x), h(x) values and the highest c(x) values. In this particular second set of nodes (B1, B2, and B3), the second node B2 would be selected (since 2+6<2+7). However, this selection by the savings route application module 105 would be different if the third node B3 was impacted by the circle of influence with radius 233RDN1 having a c(x) function equal to twenty miles (the fixed value for the circle of influence divided by the distance to the discount node (DDN1) of fourteen miles. The circle of influence having radius 233RDN1 is based on the size of the offer originating from first discount node (DN1) also referred to as an offer location.

If the third node B3 had a location that falls within the radius 233RDN1, then its routing function f(x) values would be as follows: (2+7−(20/14))=(2+7−1.4)=(2+5.6). Therefore, the third node B3 out of the three second nodes B1, B2, and B3 would have a f(x) value equal to four (2+5.6) while the first node B1 would have a value of nine (2+7) and the second node would have a value of eight (2+6). It is noted that the second circle of influence DN2 having radius 233DN2 is too far away relative to node B3, therefore, its influence is negligible in any summation of the c(x) values for node B3.

Given the impact of the first circle of influence with radius 233RDN1 on the third node B3, the savings route application module 105 would select the third node B3 instead of the second node B2 in this example among the three nodes B1, B2, B3 as the next logical node in a route or path to reach the endpoint 201B.

To further demonstrate the impact of the circle of influence for a given discount node (DN), the circle of influence for a second discount node DN2 is evaluated. The distance (DDN-C3) from node C3 to the second discount node DN2 has a value of five miles. The routing function f(x) values for node C3 separated by the distance DN2B would be as follows: f(x)=(3+6−(10/5))=(3+6−2)=(3+4)=7. In this equation, the impact of the first circle of influence radius RDN1 is negligible (compare to the second circle of influence having the radius RDN2) since node C3 is well outside the radius RDN 1 such that its relative value approaches zero.

So if the savings route application module 105 needed to select a node among the three nodes C1 (3+6), C2 (3+5), and C3 (3+4), then the module 105 would select the third node C3 because of the impact of the circle of influence with radius 233RDN2 would have on the h(x) values for node C3.

As noted previously, FIG. 5 illustrates yet one way to generate a savings route 204. There may be other ways of generating the savings route 204. For example, another method may include finding a shortest route between the start point 201A and end point 201B that passes through a particular merchant or store. In this scenario, f(x) would be set equal to the shortest-route-from-start point 201A to the store, and then the shortest-route-from the store to the end point 201B. A similar method may be employed to accommodate more intermediate points. Routes 204 that are greater than a threshold distance/time set by the operator may be rejected.

Figure 6:
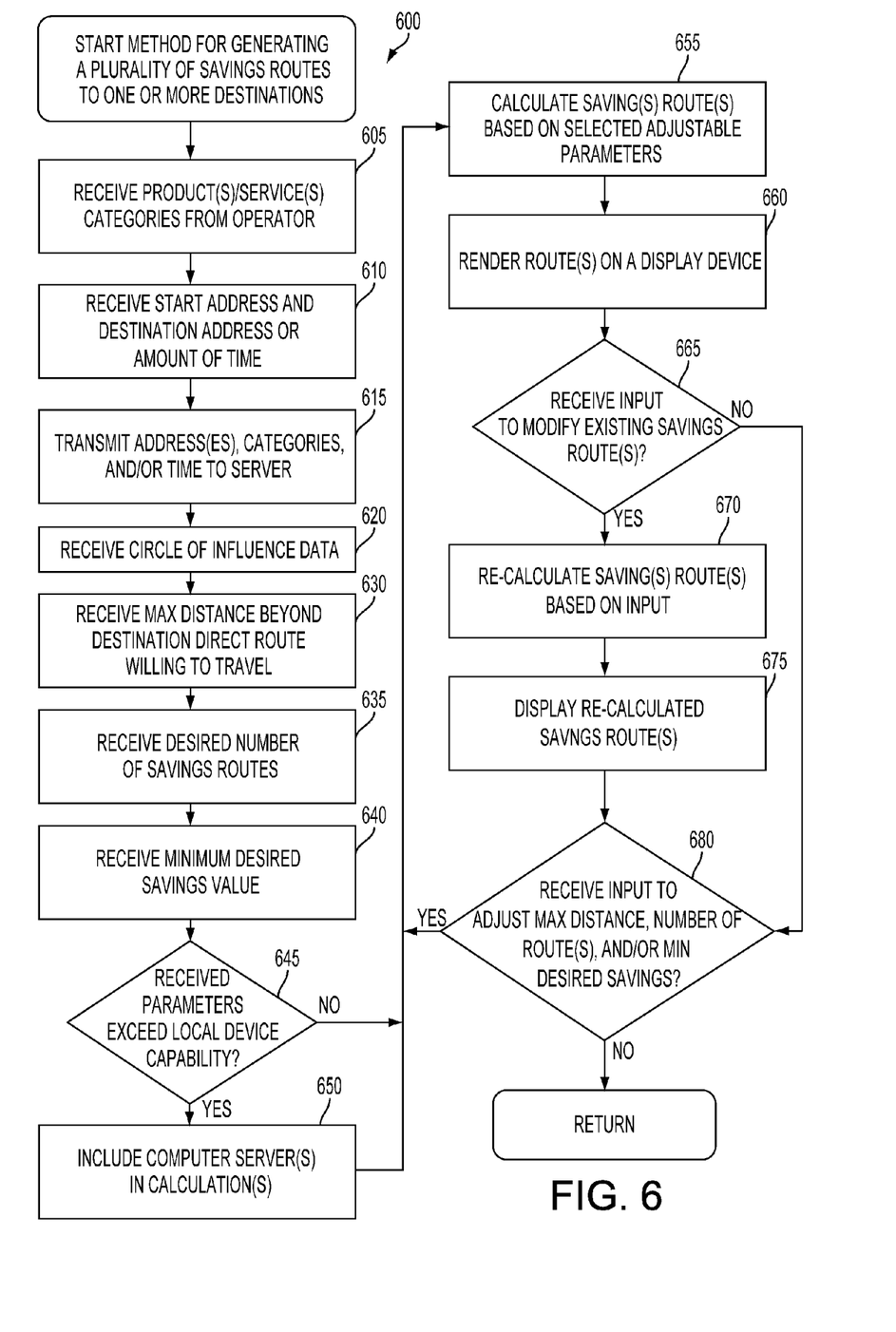
FIG. 6 is a logical flowchart illustrating a method for generating savings routes.

FIG. 6 is a logical flowchart illustrating a method 600 for generating savings routes 204. Block 605 is the first step in the method 600. In block 605, the PCD 100A may receive a selection of product and/or service categories from an operator of the PCD 100A. Alternatively, or in addition to, the PCD 100A may automatically store product and/or service categories preferred by an operator based on use of the PCD 100A. For example, the PCD 100A may track a Web browsing history of service and/or product categories that may have been viewed by the operator during an Internet browsing session. Further, the PCD 100A may also track purchases made by the operator with the PCD 100A in order to populate the categories of preferences for products and/or services selected by the operator. One of ordinary skill in the art may also appreciate that block 605 may comprise a one-time configuration step that is not always executed by method 600. For example, block 605 may comprise an operator identifying preferences in a drop-down menu when configuring the portable computing device 100A running the savings route applications module 105.

Next, in block 610, the PCD 100A may receive a start address and destination address of a location desired by the operator of the PCD 100A. The start address may comprise the current location of the PCD 100 which may be determined by using a satellite navigation system. Alternatively, the PCD 100A in this step may receive an amount of time that the operator is willing to take to discover offers among different geographic locations as determined by the PCD 100A. When the PCD 100A only receives an amount of time, the savings route application module 105 will automatically generate a route that returns the PCD 100A to the current, selected start point 201A of the PCD 100A, as understood to one of ordinary skill in the art.

Next, at block 615, the PCD 100A may transmit the destination address to the server 102. In block 620, the PCD 100A may receive circle of influence data that comprises offers from different merchants and/or vendors relative to the destination that was received by the server 102.

According to an alternate exemplary embodiment, block 615 and 620 may be skipped if the PCD 100A periodically transmits its current location to the server 102. After transmitting its current location to the server 102, they server 102 may transmit circle of influence data back to the PCD 100A for a set geographic area, such as for a city or a collection of postal zip codes relative to the current location of the PCD 100A.

Next, in block 630, the PCD 100A may receive a maximum distance the operator is willing to travel relative to the destination. The data received in this block 630 may correspond with the first slider bar 210A as illustrated in FIGS. 3-4.

In block 635, the PCD 100A may receive a desired number of savings routes 204 that should be displayed in a map 200. This block 635 may correspond with the second slider bar 210B as illustrated in FIGS. 3-4.

In block 640, the PCD 100A may receive a minimum desired savings value set for each savings route 204. This block 640 may correspond with the third slider bar 210C as illustrated in FIGS. 3-4.

Next, in decision block 645, the PCD 100A, and specifically the savings route application module 105, may determine if the parameters inputted by the operator in the previous blocks exceeds the hardware and/or software capabilities of the PCD 100A. If the inquiry to decision block 645 is negative, then the "NO" branch is followed to routine block 655, avoiding block 650. If the inquiry to decision block 645 is positive, then the "YES" branch is followed to block 650 in which the PCD 100A may work in combination with the server 102 in order to calculate the routes in routine block 655 described below.

In routine block 655, the savings route application module 105 of the PCD 100A (and possibly the server 102) calculate the savings routes based on the selected set of adjustable parameters received in blocks 605 through block 640. Further details of routine block 655 will be described below in connection with FIG. 7.

After routine block 655, in block 660, the PCD 100A renders routes on the display device 132 as illustrated in FIGS. 2-4. In decision block 665, the savings route application module 105 determines if any input has been received to modify existing routes being displayed on the display device 132. Decision block 665 generally corresponds with an operator selecting or deselecting one or more offers 206 as illustrated in FIG. 4.

If the inquiry to decision block 665 is positive, then the "YES" branch is followed to block 670. If the inquiry to decision block 665 is negative, then the "NO" branch is followed to decision block 680.

In block 670, the savings route application module 105 (and possibly the server 102) may recalculate entire savings routes 204 or portions of savings routes 204 depending upon what offers 206 are selected by an operator such as illustrated in FIG. 4. In block 675, the savings route application module 105 displays the recalculated savings routes 204 based on the recalculation in block 670.

In decision block 680, the savings route application module 105 determines if the operator has provided input to adjust the maximum distance, the number of routes, and/or the minimum desired savings value for each savings route 204. Decision block 680 generally corresponds with any input received with the user interface 207 comprising the slider bars 210 as illustrated in FIGS. 3-4.

If the inquiry to decision block 680 is negative, then the "NO" branch is followed in which the method 600 ends. If the inquiry to decision block 680 is positive, then the "YES" branch is followed back to routine block 655.

Figure 7:
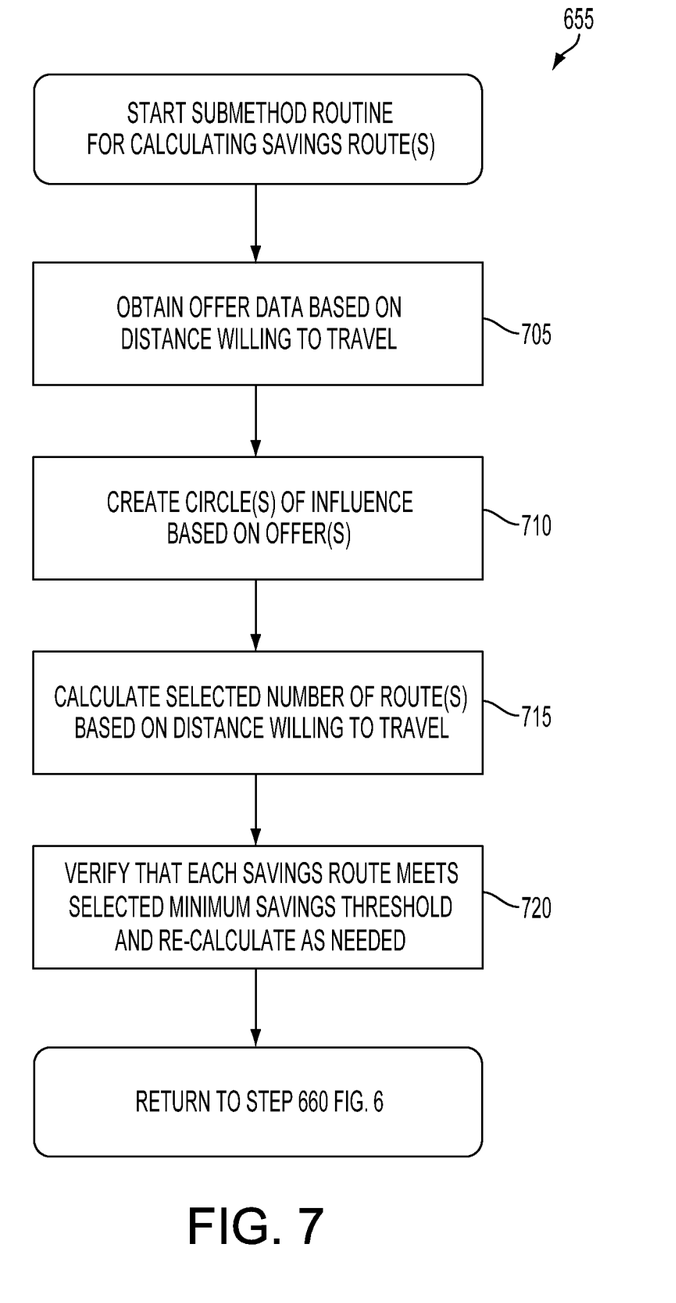
FIG. 7 is a logical flowchart illustrating a submethod or routine for generating savings routes based on selected parameters.

FIG. 7 is a logical flowchart illustrating a submethod or routine 655 for generating savings routes based on selected parameters. Block 705 is the first step of the sub method 655. In block 705, the server 102 receives the offer data 109 from the one or more merchant computers 100B.

In block 710, the server 102 creates one or more circles of influence 233 based on the offer data 109. Next, in block 715 the savings route application module 105 running on the PCD 100A or running on the server 102 (or both) may calculate the selected number of savings routes 215B based on the selected distance 215A that the operator is willing to travel. The selected number of savings routes 215B and the selected distance 215A that the operator of the PCD 100A is willing to travel corresponds to the selections made with the slider bars 210 as illustrated in FIGS. 3-4.

As noted previously, for routes having a magnitude of about one hundred miles or less, a PCD 100A will generally have sufficient computing power to generate the selected number of savings routes. However, for routes having magnitudes greater than about one hundred miles, in some situations it may be beneficial to leverage computing resources available from the computer server 102 as understood by one of ordinary skill in the art.

Next, in block 720, the savings route application module 105 may verify that each savings route 233 is greater than or equal to the selected the minimum savings threshold 215C as illustrated in FIGS. 3-4. If a particular savings route 233 is less than the selected minimum savings threshold 215C, then the savings route application module 105 will drop this route 233 and calculate a new one to achieve the desired selected minimum savings threshold 215C. The submethod 655 then returns to block 660 of FIG. 6.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

According alternate exemplary embodiments, the savings route application module 105 may also display an estimated total time that may be spent per savings route 233 in addition to displaying the total distance traveled. Further, the savings route application module 105 may also display an estimated amount of gasoline costs based on distance per energy measure, such as miles per gallon (MPG) of gas for fossil-fuel based vehicles or an amount of electrical charge needed for distance traveled for electric vehicles, etc.

The savings route application module 105 may also deduct the estimated amount of energy (gasoline, electricity, etc.) costs against the total savings benefits estimated for a particular savings routes 233. In such a situation, the savings route application module 105 may deduct the estimated amount of energy costs before it compares a particular savings route 233 against the minimum savings threshold 215C selected with slider bars 210C as illustrated in FIGS. 3-4.

The savings route application module 105 may also display an overall cost-benefit ratio parameter that ways the total costs (that may include money spent and time spent) against the total number of benefits (that may include the total savings available for a particular savings route 233). Other variations of these exemplary embodiments are understood by one of ordinary skill the art.

Although selected aspects have been illustrated and described in detail, it will be understood that various substitutions and alterations may be made therein without departing from the spirit and scope of the present invention, as defined by the following claims.

What is claimed is:

1. A method for calculating savings routes for display on a portable computing device (PCD) comprising:

receiving at least one of a product category and a service category;
receiving a desired destination address;
receiving circle of influence data based on an offer for at least one product or service corresponding to the product category or service category;
calculating one or more savings routes based on the circle of influence data and the desired destination address; and
displaying the one or more savings routes on a display screen of the PCD.

2. The method of claim 1, further comprising:
receiving a maximum distance an operator of the PCD is willing to travel relative to the destination address.

3. The method of claim 1, further comprising:
receiving a desired number of savings routes for display on the display screen of the PCD.

4. The method of claim 1, further comprising:
receiving a minimum desired savings value corresponding to benefits available for each calculated savings route.

5. The method of claim 1, further comprising:
transmitting the at least one of the product category and the service category to a computer server.

6. The method of claim 1, further comprising:
receiving input to modify existing routes being displayed on a display device of the PCD.

7. The method of claim 1, further comprising:
displaying each savings route with a unique graphical element on the display device of the PCD.

8. The method of claim 7, further comprising:
displaying each savings route with at least one of a unique color and a unique shape.

9. The method of claim 1, wherein the PCD comprises at least one of a mobile telephone, a personal digital assistant, a pager, a smartphone, a navigation device, and a hand-held computer with a wireless connection or link.

10. A computer system for calculating savings routes for display on a portable computing device (PCD), the system comprising:
a processor operable to:
receive at least one of a product category and a service category;
receive a desired destination address;
receive circle of influence data based on an offer for at least one product or service corresponding to the product category or service category;
calculating one or more savings routes based on the circle of influence data and the desired destination address; and
display the one or more savings routes on a display screen of the PCD.

11. The system of claim 10, wherein the processor is further operable to:
receive a maximum distance an operator of the PCD is willing to travel relative to the destination address.

12. The system of claim 10, wherein the processor is operable to:
receive a desired number of savings routes for display on the display screen of the PCD.

13. The system of claim 10, wherein the processor operable to:
receive a minimum desired savings value corresponding to benefits available for each calculated savings route.

14. The system of claim 10, wherein the processor is operable to:
transmit the at least one of the product category and the service category to a computer server.

15. The system of claim 10, wherein the processor is further operable to:
receive input to modify existing routes being displayed on a display device of the PCD.

16. The system of claim 10, wherein the processor is further operable to:
display each savings route with a unique graphical element on a display device of the PCD.

17. The system of claim 10, wherein the processor is further operable to:
display each savings route with at least one of a unique color and a unique shape.

18. The system of claim 10, wherein the PCD comprises at least one of a mobile telephone, a personal digital assistant, a pager, a smartphone, a navigation device, and a hand-held computer with a wireless connection or link.

19. A computer system for managing one or more memory resources of a wireless handheld computing device, the system comprising:
means for receiving at least one of a product category and a service category;
means for receiving a desired destination address;
means for receiving circle of influence data based on an offer for at least one product or service corresponding to the product category or service category;
means for calculating one or more savings routes based on the circle of influence data and the desired destination address; and
means for displaying the one or more savings routes on a display screen of the PCD.

20. The system of claim 19, further comprising:
means for receiving a maximum distance an operator of the PCD is willing to travel relative to the destination address.

21. The system of claim 19, further comprising:
means for receiving a desired number of savings routes for display on the display screen of the PCD.

22. The system of claim 19, further comprising:
means for receiving a minimum desired savings value corresponding to benefits available for each calculated savings route.

23. The method of claim 19, further comprising:
means for transmitting the at least one of the product category and the service category to a computer server.

24. The system of claim 19, further comprising:
means for receiving input to modify existing routes being displayed on a display device of the PCD.

25. The system of claim 19, further comprising:
means for displaying each savings route with a unique graphical element on the display device of the PCD.

26. The system of claim 25, further comprising:
means for displaying each savings route with at least one of a unique color and a unique shape.

27. The system of claim 19, wherein the PCD comprises at least one of a mobile telephone, a personal digital assistant, a pager, a smartphone, a navigation device, and a hand-held computer with a wireless connection or link.

28. A computer program product comprising a non-transitory computer usable medium having a computer readable program code embodied therein, said computer readable program code adapted to be executed to implement a method for calculating savings routes for display on a portable computing device (PCD), said method comprising:
receiving at least one of a product category and a service category;
receiving a desired destination address;

receiving circle of influence data based on an offer for at least one product or service corresponding to the product category or service category;

calculating one or more savings routes based on the circle of influence data and the desired destination address; and displaying the one or more savings routes on a display screen of the PCD.

29. The computer program product of claim 28, wherein the program code implementing the method further comprises:

receiving a maximum distance an operator of the PCD is willing to travel relative to the destination address.

30. The computer program product of claim 28, wherein the program code implementing the method further comprises:

receiving a desired number of savings routes for display on the display screen of the PCD.

31. The computer program product of claim 28, wherein the program code implementing the method further comprises:

receiving a minimum desired savings value corresponding to benefits available for each calculated savings route.

32. The computer program product of claim 28, wherein the program code implementing the method further comprises:

transmitting the at least one of the product category and the service category to a computer server.

33. The computer program product of claim 28, wherein the program code implementing the method further comprises:

receiving input to modify existing routes being displayed on a display device of the PCD.

34. The computer program product of claim 28, wherein the program code implementing the method further comprises:

displaying each savings route with a unique graphical element on the display device of the PCD.

35. The computer program product of claim 34, wherein the program code implementing the method further comprises:

displaying each savings route with at least one of a unique color and a unique shape.

36. The computer program product of claim 28, wherein the PCD comprises at least one of a mobile telephone, a personal digital assistant, a pager, a smartphone, a navigation device, and a hand-held computer with a wireless connection or link.

* * * * *